July 20, 1937.   W. G. KNIGHTS   2,087,671
WEED EXTRACTING IMPLEMENT
Filed Feb. 16, 1937

Inventor
William George Knights

Patented July 20, 1937

2,087,671

UNITED STATES PATENT OFFICE 2,087,671

WEED EXTRACTING IMPLEMENT

William George Knights, Calgary, Alberta, Canada

Application February 16, 1937, Serial No. 125,948
In Canada February 20, 1936

1 Claim. (Cl. 55—148)

My invention relates to improvements in weed extracting implements for garden and general agricultural uses, in which a soil prodding chisel ended and edged spade operates in conjunction with a weed gripping arm hinged and manipulated in such a manner as to grasp the weed ready for extraction from the ground; and the objects of my improvement are to provide an extremely simple weed extractor that obviates the necessity of stooping or kneeling down when removing weeds from the soil, and one that is a positive improvement over the usual digging tools generally employed for this purpose, as it effectively holds the weed at its roots after the digging movement is applied, thus assuring removal when the tool is subsequently pulled from the ground.

I attain these objects by the device illustrated in the accompanying drawing, in which—

Similar numerals refer to similar parts throughout the several views.

Figure 1:
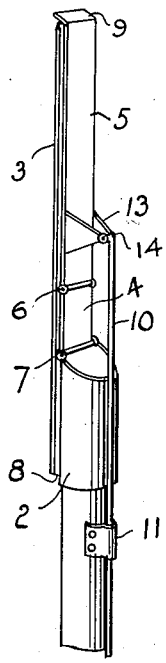
Fig. 1 is a view of the implement in perspective.

The numeral 1 has reference to a long handle of the rake or hoe variety to the extreme end of which is fastened a ferrule or cap 2, this ferrule being merely for the prevention of splitting the end of the handle 1. A pronged element 3 extends from the ferruled end of the handle 1 and is fastened thereto and forms the digging and earth loosening element of the device. The edges of the said element 3 are chisel shaped, as is also its extreme end. Attached also to this same end of the handle 1 is a jointed lever consisting of two parts 4 and 5, these parts being pivoted at 6 to form a two-piece lever as mentioned, the whole being hingedly pivoted at the point 7, this said point or pivot being rigidly attached to the base end of the prong 3 by means of an extended plate 8 attached to the handle through the ferrule 2 and between prong 3 and the said ferrule. This plate 8 forms the support for the fulcrum 7 of the lever arm 4—5. The lever arm 5 is flat in shape and terminates in a bent end as shown at 9 to extend slightly beyond and over the chisel end of the prong 3 when in normal out-of-use position or in gripping position. The lever 4—5 is made to approach the prong after digging operations begin by means of a slidable push rod 10 running parallel to the handle 1, which rod is maintained in slidable position by brackets 11 attached at intervals along the said handle. This rod 10 terminates towards the upper end of the handle 1 in a grip handle 12 for the manipulation of the sliding action of the said rod. This rod is connected to the lever 5 by means of a bracket 13 attached to and projecting from the lever 5. The length and exact position of the said bracket determines the radial swing of the lever system 4—5. The main object of the joint at the point 7 is to maintain the parallel action of the sliding rod 10 longitudinally with the handle 1 when bringing the lever 5 and the prong 3 together at least for part of the way. To complete the closure of these two members the rod 10, pivotally attached to the bracket 13 at a point 14, is pushed further downwards until the weed root is gripped firmly.

Figure 2:
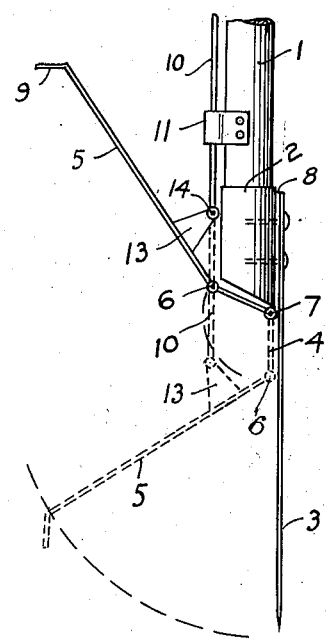
Fig. 2 is a detail of the implement's lower end as in active positions.
Figure 3:
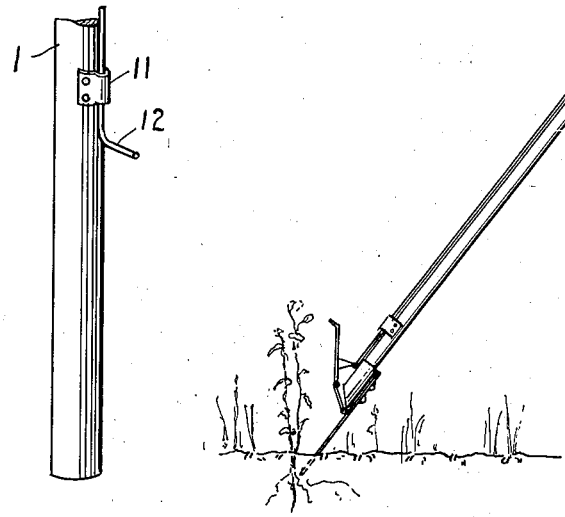
Fig. 3 is an elevation in operative position on the ground.

The various positions of the lever 4—5 with respect to the prong member 3 are outlined in Fig. 2, the actual relative angular positions between them appear to be variable providing the performance in swinging the lever 5 backwards towards the handle 1 is carried out without interference through wedging.

To properly understand the uses and operation of this tool it is here pointed out that when the rod 10 is pulled upwards, and the prong 3 has been inserted into the ground and turned around the weed to be extracted, a pushing action on the said rod contacts the end of the lever 5 with the weed at its root end, holding firmly at the root and grasping it between the lever 5 and the prong 3, ready for easy extraction of the weed in a more or less entire condition.

I claim:—

A weed extracting implement of the type described comprising a rod handle, an attached protecting ferrule on its lower end, a digging prong extending from the said ferruled end, a short plate lever hingedly attached towards the base of this said prong and to the ferruled end of the said rod, a second and longer plate lever pivotally attached to and extending from the said short lever and having its tip bent slightly to overlap the tip of the said digging prong, a bracket projecting from the said long lever on the outer face as when the prong and levers are positioned together, a push-and-pull rod pivotally connected to the said bracket and slidably positioned adjacent to the said handle to pivotally actuate the said two levers for closing together and separating the said two levers and the prong by the manipulation of the said push-and-pull rod in a direction longitudinal with the axis of the said handle, and means for supporting for slidable action the said rod on the said handle.

WILLIAM GEORGE KNIGHTS.